Jan. 17, 1961
E. L. R. CORLISS ET AL
2,968,695
SYSTEM FOR MONITORING AND CONTROLLING THE MOTION OF A SOUND SOURCE
Filed Sept. 8, 1955
3 Sheets-Sheet 1
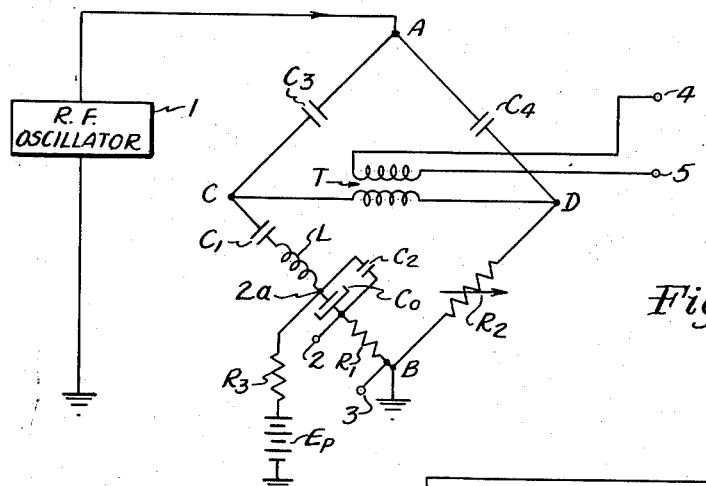
Fig. 1-A
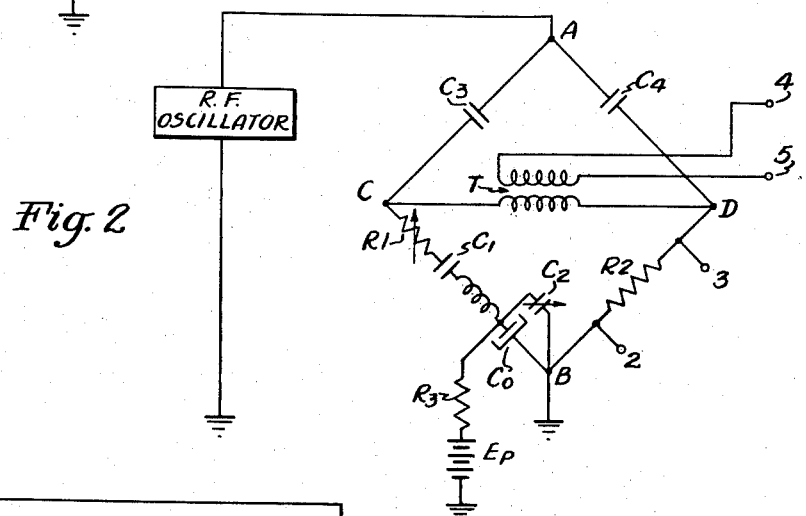
Fig. 2
Fig. 3
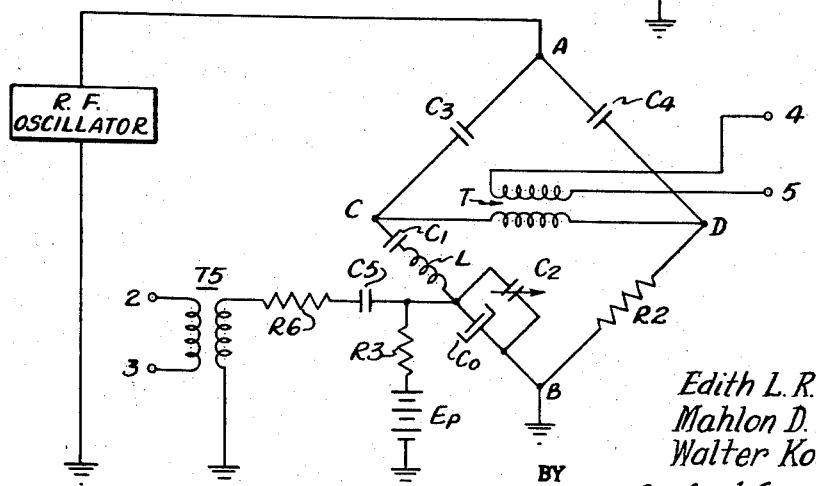
INVENTORS
Edith L. R. Corliss
Mahlon D. Burkhard
Walter Koidan
BY Arthur Vinograd ATTORNEY

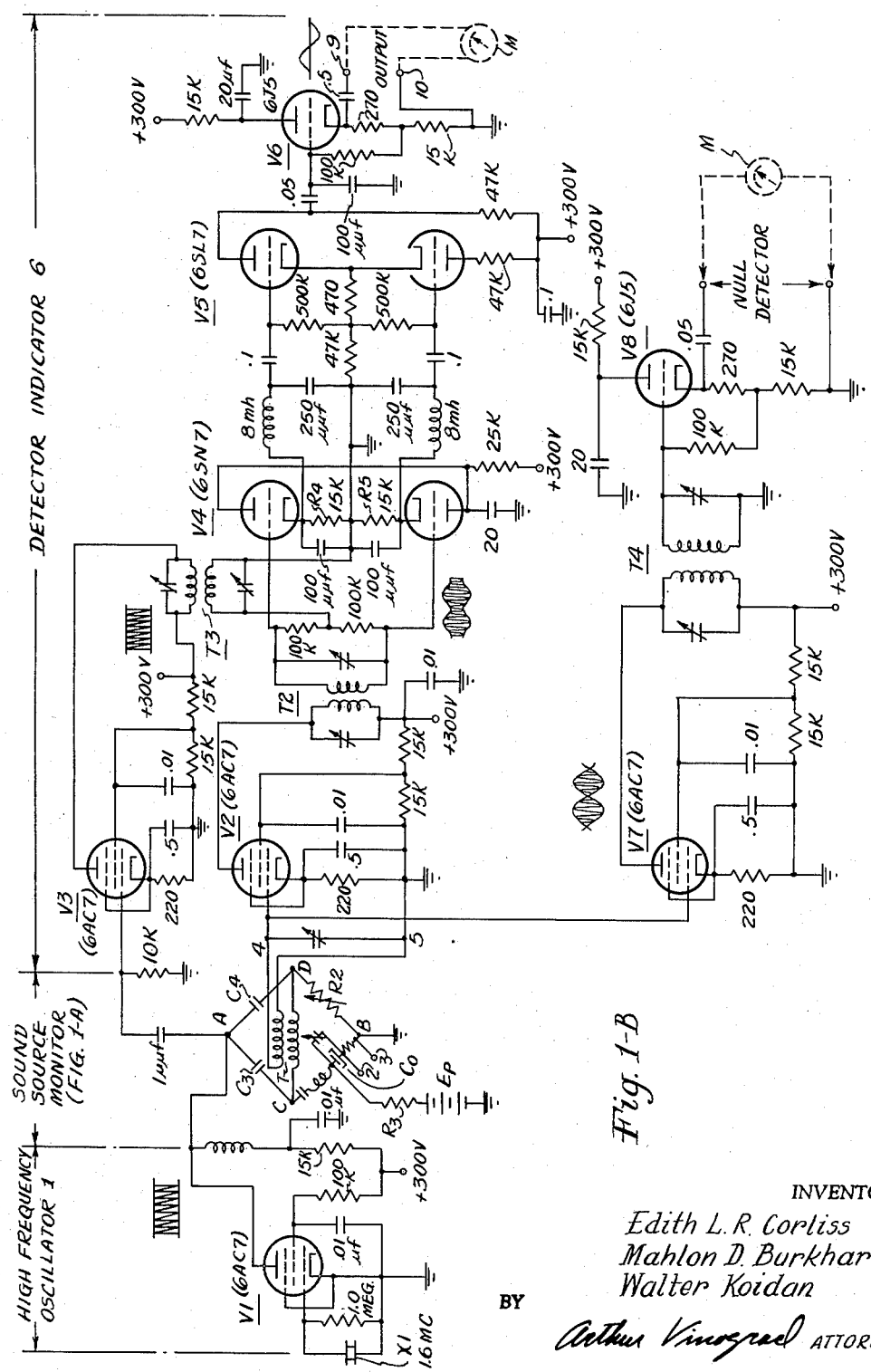
Fig. 1-B

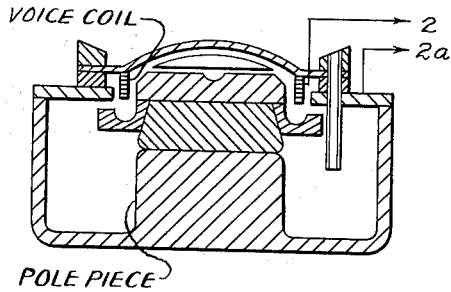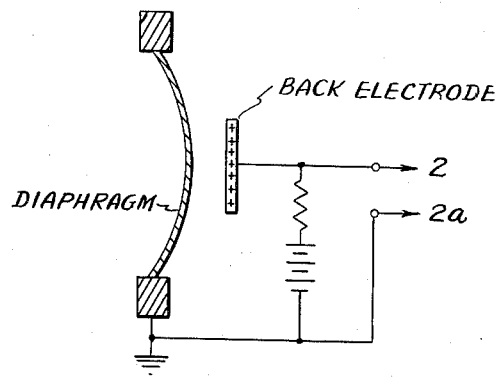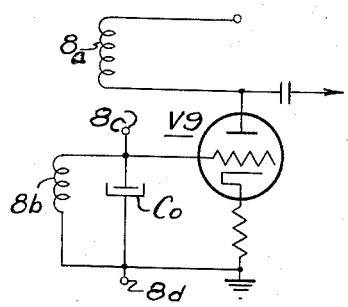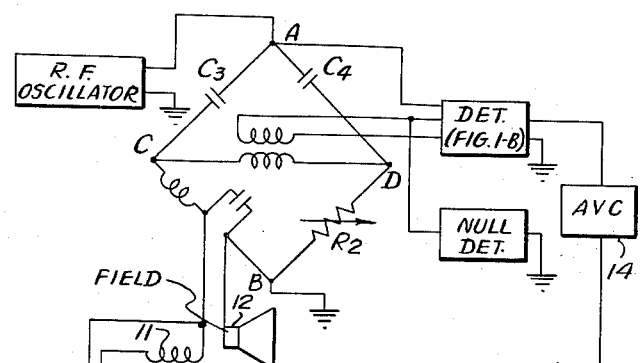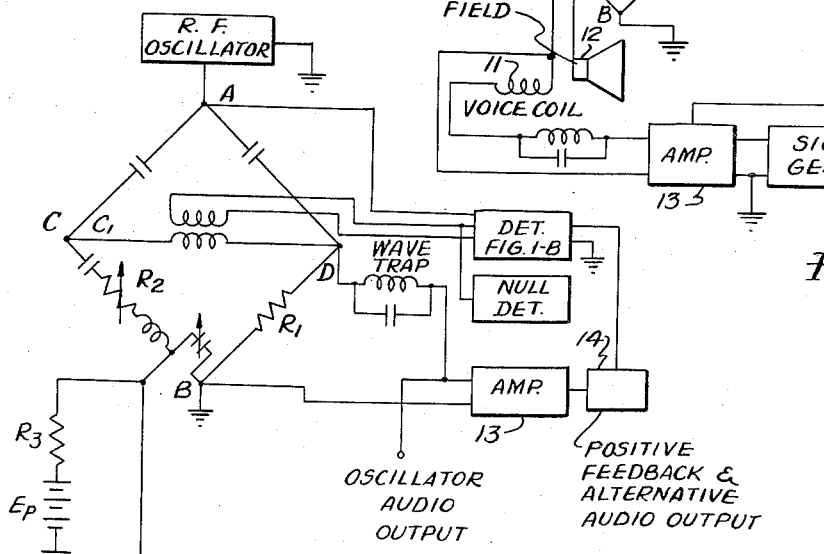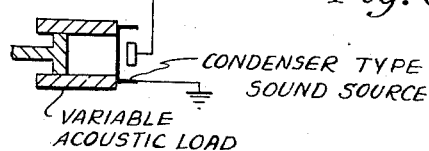

United States Patent Office 2,968,695
Patented Jan. 17, 1961

2,968,695
SYSTEM FOR MONITORING AND CONTROLLING THE MOTION OF A SOUND SOURCE

Edith L. R. Corliss, Washington, D.C., and Mahlon D. Burkhard, Kensington, and Walter Koidan, Hyattsville, Md., assignors to the United States of America as represented by the Secretary of Commerce Filed Sept. 8, 1955, Ser. No. 533,262

1 Claim. (Cl. 179—1)

This invention relates to the measurement and generation of sound and particularly contemplates a method and apparatus for accurately measuring the displacement and controlling the excursions of a sound source such as the dynamic element of an electrically-driven transducer.

In accordance with the principles of this invention, an electrical signal derived from the change of configuration or displacement of the movable element in a transducer is utilized to monitor the motion of a sound source or may be used to duplicate the motion of the transducer movable element in response to a known driving signal. In general, the change in configuration of a transducer having a movable element sound source is reflected, by suitable instrumentalities, as proportional changes in the electrical reactance between the moving and fixed elements of the transducer, and such reactance changes may be detected by means of an auxiliary signal of different frequency than the sound source signal. Moreover, the output of the reactance-change detecting system employed may be fed back into the energization means for the transducer and thereby serve as a means for stabilizing the output of the sound source or movable element or for operating it according to an arbitrarily chosen characteristic.

It is therefore an object of this invention to provide a method and means for deriving a signal proportional to the actual spatial motion of the movable element sound source in a transducer which can readily be electrically separated from the electrical energizing signal for the transducer.

Another object of this invention is to provide a method and apparatus which is capable of accurately measuring the displacement of the dynamic element in a transducer.

An additional object of this invention is to provide a sound calibration system in which direct displacement matching of the sound source movable element is obtained as compared to generated voltage-signal matching.

A further object of this invention is to provide a method and apparatus for using the signal derived from the spatial motion of the movable element in a transducer for controlling the physical motion of such element.

A still further object of this invention is to provide a method for using any mechanical load which will influence the deflection of the transducer movable element as the tuning element in an oscillator, by using positive feedback of the signal derived from the physical motion of the movable element.

Other uses and advantages of the invention will become apparent upon reference to the specification and drawings.

Fig. 1A is a schematic diagram of one embodiment of the invention;

Fig. 1B is a circuit schematic showing the invention illustrated in Fig. 1A in combination with a suitable oscillator and detecting circuit;

Fig. 2 is a modification of the invention as applied to a grounded transducer;

Fig. 3 is a further modification of the invention employing an insert signal directly across the sound source;

Fig. 4 illustrates the construction of a condenser-type transducer;

Fig. 5 shows the pertinent portions of an electrodynamic-type transducer which are employed in connection with the apparatus of this invention;

Fig. 6 shows an alternate embodiment of the invention;

Fig. 7 is a block diagram of the mechanism according to this invention applied to stabilize the motion of a sound source, and Fig. 8 illustrates the use of the invention in converting a mechanical loading of the transducer into the tuning element in an oscillator.

The sound source in conventional types of transducers generally comprise an armature or moving element, the motion of which is produced by a signal energization source. The motion of the sound source can generally be controlled, according to conventional methods, either by driving the source at a known voltage or by stabilizing the energizing signal driving the source through the use of inverse feedback from the electrical circuit into which the source is connected. When the source is driven at a known voltage, fluctuations in its efficiency cannot be compensated. When ordinary inverse feedback is employed, the feedback signal is derived from the changes in electrical impedance in the electrical circuit driving the source that results from changes in the mechanical motion of the transducer. However, since the feedback signal is taken from an electrical circuit in which other electrical elements are also present, the resulting signal is only partly dependent upon the motion of the sound source in the transducer. The feedback system is therefore not uniformly sensitive over the range of frequencies at which the sound source is being driven, and its effectiveness is limited mainly to the frequency spectrum defined by a mechanical resonance of the transducer.

Still another known method for controlling the motion of a sound source employs an auxiliary microphone for sampling the sound field generated by the source. The output of the microphone is then either monitored or fed back into the electrical system which supplies the signal to the sound source. The auxiliary microphone method requires an extremely stable microphone. Moreover, the orientation of the microphone in the sound field is critical, especially at high frequencies.

According to one form of the present invention, the sound source in a transducer may be driven by an electrical signal and the sound source forms an electrical component in a modulating circuit through which a high frequency carrier is passed. The sound source cannot respond to the carrier frequency. Excursions of the sound source produce physical displacements which are manifested as reactance changes in the modulating circuit according to one form of the invention and the reactance change can be manifested as an amplitude, phase or frequency variation or modulation of the carrier. Demodulating the resulting signal produces a control signal which can be utilized to monitor the motion of the sound source. By policing the sound source movements in this manner, control thereof is readily achieved by regulating the driving signal applied to the source so that the desired motion is always produced. Alternately, the control signal may also be fed back to the energizing circuit and control the amplitude of the driving signal so that the sound source can be operated according to an arbitrarily chosen amplitude.

The principle of the present invention also makes it possible to obtain precise measurements of sound pressures with a circuit having particularly low noise-level properties used as a preamplifier for high impedance microphones, such as the standard condenser microphone used in sound calibration work. High impedance microphones of such type normally have high inherent noise levels at audio frequencies and are further subject to stray field pick up. Moreover, the amplifier employed with such microphones must present a high input impedance to the microphone. The use of a microphone as a modulating element in a radio-frequency circuit is known. The internal impedance of both condenser and crystal microphones is low at such frequencies, so that the amount of stray field that they pick up is greatly reduced. In addition, the radio-frequency circuit may be designed to reject frequencies that might be picked up electrically, since the modulation will be induced only by changes in the electrical reactance of the microphone caused by the motion of the moving elements. In general, the stray electric field picked up will not induce any modulation in the radio-frequency carrier.

The usual circuit arrangement used at high frequencies does not lend itself to precision measurements. Where the highest degree of precision is desired, a calibrated matching voltage must be inserted in such a way that its magnitude produces the same indication as does the signal undergoing measurement. Previous types of radio-frequency amplifying circuits reject the inserted audio-frequency signal by the same process by which stray electrical fields are rejected; that is, its presence may not produce any modulation of the high frequency, or the audio signal may not fall within the pass-band of the high-frequency circuit employed.

As an application of the present invention, the fact that the audio-frequency signal is rejected by radio-frequency detecting circuits provides a characteristic that makes it possible to improve the precision with which measurements of sound pressure can be made when the microphone is used in a radio-frequency preamplifying circuit.

In place of matching the voltage put out by the microphone, as is done for precision measurements with an audio-frequency type of preamplifier, in this invention a matching signal is applied to the microphone in a radio-frequency preamplifying circuit such that it produces the same excursion of the moving element sound source in the microphone as did the sound pressure to be measured. This can be done without affecting the sensitivity of the radio-frequency preamplifier since it will reject the electrical audio-frequency signal, responding only to the signal modulation produced by motion of the moving element in the microphone. A special calibration of the microphone is required for this application of the invention; it can, however, be performed with the same precision as the ordinary reciprocity type of calibration employed when the microphone is used in the more common audio-frequency amplifying circuit.

When a sound transducer such as a condenser microphone is used, a known "insert" voltage can be employed in the monitoring system such that the sound source movable element in the microphone will be driven at an amplitude corresponding to the amplitude of motion of the microphone when exposed to sound. By driving the sound source in the microphone with such measured voltage, the sensitivity of the microphone metering system is eliminated from the measurement, analogous to the use of an "insert" voltage as employed in conventional cathode-follower circuits. In such application, a polarizing voltage is maintained on the condenser-type microphone. In the case of crystal microphones, no change in technique is needed because they are, in effect, self-polarized.

Fig. 1A shows one modification of the invention which is suited to a modified "insert" technique when a condenser-type microphone is used as a transducer for sound. In accordance with the circuit shown in Fig. 1A the transducer is designated as $C_0$ which symbolizes the capacitance defined by the movable element and base respectively of a transducer. For example, in the condenser microphone schematically represented in Fig. 4, the membranous diaphragm and back electrode form the plates of a condenser having a capacitance $C_0$ while in the electrodynamic transducer illustrated in Fig. 5 the voice-coil and pole piece or magnet similarly represent a capacitor $C_0$. The capacitor forming elements are connected directly into one arm of a bridge circuit A—B—C—D by connecting the leads shown in Figs. 4 and 5 at points 2–2a in Fig. 1A. The arm B—C of the bridge which includes the sound source may be tuned for series resonance by means of a variable reactor such as the capacitor C2. The total resistance of the arm B—C at resonance is balanced in a conventional manner by the resistor R2 in the arm B—D. The arm B—C of the bridge is completed by the resistor R1, inductance L and capacitor C1 while the remaining arms of the bridge A—C and A—D consist of two equal capacitors C3 and C4, respectively. The capacitors C3 and C4 are chosen to present a high-bridge-input impedance.

A carrier frequency source in the form of an oscillator 1 is applied across terminals A, B of the bridge while a polarizing voltage for the sound source elements in the microphone is obtained from a suitable bias source such as $E_p$ applied through resistor R3. The carrier employed has a different frequency than the frequency range to which the sound source responds and hence the carrier generates no motion in the latter.

The center arm of the bridge comprises a transformer T having primary and secondary windings, the secondary being brought out to terminals 4 and 5 which form the bridge output. The transformer T provides a high impedance bridge output at the carrier frequency. Terminals 2 and 3 are provided across the resistor R1 for applying the energizing signal for the transducer represented by $C_0$ in Fig. 1. Since the elements of the transducer comprise the capacitor $C_0$ in the bridge, the motion of the moving element of the transducer in response to such driving signal will produce a variation in the capacitance of the bridge arm B—C. The bridge is concurrently energized by the high-frequency source 1, modulation will therefore occur and a pair of high-frequency sideband signals will be obtained across the terminals 4 and 5. The bridge output can be derived as follows:

Referring to Fig. 1A, the current through the L.-C. branch of the bridge is equal to that through R2 under conditions of balance. If I designates the peak value of such current, the instantaneous voltage at terminal C can be expressed as:

$$v_C = I \sin \omega t \left[ r + j\left( \omega L - \frac{1}{\omega(C_0 + \Delta C_0 \sin pt)} \right) \right] \quad (1)$$

where $p$ is the angular frequency of the transducer motion, and where $r$ is the effective resistance of the L.-C. branch $\omega$ is the angular frequency of the carrier, $C_0$ is the total capacitance of the transducer $C_0$ and $\Delta C_0$ is the peak variation in capacitance. The voltage at terminal D can be expressed as:

$$v_D = IR \sin \omega t \quad (2)$$

When the bridge is correctly adjusted, $R=r$ and the output voltage is $$v_0 = v_C - v_D = jI \sin \omega t \frac{\omega^2 L C_0 + \omega^2 L \Delta C_0 \sin pt - 1}{\omega(C_0 + \Delta C_0 \sin pt)} \quad (3)$$

Since $\omega^2 LC = 1$, and $\Delta C_0 \sin pt \ll C_0$ $$v_0 = j \frac{I}{\omega C_0^2} \Delta C_0 \sin \omega t \sin pt \quad (4)$$

By trigonometric substitution, $$v_0 = j \frac{1}{\omega C_0^2} \Delta C_0 \frac{1}{2} [\cos (\omega - p)t - \cos (\omega + p)t] \quad (5)$$

The voltage $v_0$ is therefore a suppressed carrier, containing both the upper and lower side bands, $(\omega + p)$ and $(\omega - p)$, but not the carrier. The envelope of the high-frequency carrier signal will therefore be determined by the excursions of the movable element comprising the particular sound source represented by $C_0$.

In order to extract the audio frequency, the suppressed carrier and the original carrier are combined to produce an amplitude modulated wave, which may then be demodulated in a push-pull infinite impedance-type detector. The balanced audio output will then correspond to the mechanical input to the sound source of the transducer $C_0$.

Detection by carrier insertion is accomplished in the following manner. The output signal obtained at terminals 4 and 5 of the bridge (Fig. 1A) is applied to a suitable detector-indicator system of the type illustrated in Fig. 1B. The apparatus described in connection with Fig. 1A is shown in the relation it occupies in the circuit diagram of Fig. 1B together with a typical oscillator 1 and vibration-detector-indicator circuit 6. The characteristics of the detecting system 6 are such that the frequency by which the sideband signals are displaced from the initial high-frequency signal will be the same as that of the electrical signal driving the sound source, but such driving signal is rejected by a tuned detector system as will be described.

In Fig. 1B, the high-frequency source 1, comprises a conventional crystal-controlled oscillator consisting of an oscillator tube V1 of the 6AC7 type and a frequency-determining crystal X1. The oscillator circuit is conventional, the value of the components being detailed in Fig. 1B. The oscillator output is applied to terminals A and B of the bridge circuit (Fig. 1A) and the output terminals 4—5 of the bridge are connected to the detector-indicator circuit 6 as shown.

The detector portion of the circuit shown in Fig. 1B includes an amplifier V2 to which the output of the bridge is applied, a balanced modulator-type mixer V4, a phase shifter and amplifier V3 for injecting the carrier into the balanced modulator, a phase reverter V5, and cathode-follower output stage V6. The circuit shown in Fig. 1B also includes a null detector V7—V8 for balancing the bridge.

The transformers T2, T3 and T4 shown in Fig. 1B are each tuned to the frequency of the carrier obtained from oscillator 1.

When the bridge (Fig. 1A) is balanced in the absence of any motion, no reactance variation occurs in arm B—C, and hence no output is obtained at terminals 4—5.

When the bridge is off adjustment to the extent of a steady state unbalance, the carrier signal will appear at output terminals 4—5 and is applied as shown in Fig. 1B to the input of V7 of the null detector. Because of such arrangement, the bridge may easily be balanced by adjusting the trimming elements of the bridge until zero output is obtained at the null detector, as indicated by a suitable A.C. vacuum tube type voltmeter, M1.

After the bridge has been initially balanced in such manner energization of the transducer sound source as will be described will produce a reactance variation in the bridge arm B—C at an audio rate and, as a result of amplitude modulation of the carrier, and the carrier rejection produced by the bridge, only the referred-to side-band signals $(\omega+p)$ and $(\omega-p)$ will appear as the bridge output at terminals 4—5.

The side-band signals are amplified in V2 and applied through transformer T2 to the grids of V4. The carrier signal is also applied to the grid terminal V4 through transformer T3. Since the tube V4 is connected as a balanced modulator-type circuit, mixing of the side bands and carrier is obtained, and a demodulated signal is obtained across the cathode resistors R4 and R5 of tube V4.

The demodulated signal is amplified in V5 which is connected as a phase reverter and changes the double-ended input signal into a single-ended output signal, manifested at the output of cathode follower V6. The signal may be observed or recorded by a suitable meter or indicator M2 applied to terminals 9—10 or the output signal may be operatively utilized as will be described.

Such output is a pure audio signal which reflects the capacitance change due to the movements of the sound source and is representative of the excursions of the sound source. The signal can therefore also be employed to monitor the motion of such source in various ways as will be described.

It is to be noted that the characteristics of a capacitance-type transducer, as well as a crystal transducer, are such that no electrodes in addition to those required for applying the driving and high-frequency signals are necessary since both such signals can be simultaneously applied to the transducer terminals as indicated in Fig. 1A. Fig. 4 shows the essential components of a typical capacitance-type transducer. The terminals 2, 2a connected to the transducer may be directly connected into the arm B—C of the bridge shown in Fig. 1A in the position occupied by the transducer symbolized as $C_0$. When an electromagnetic type of transducer is used, the capacitance between the magnet and a moving voice-coil sound source provides a reactance varying means in accordance with the principles of this invention. Moreover, if the inductance of the coil in an electromagnetic transducer is not too great, the variation in inductance caused by the motion of its moving element can be utilized in a tuned circuit arrangement similar to that shown in Fig. 1A without employing additional electrodes. A typical electrodynamic transducer including a voice-coil, field magnet, and diaphragm is shown in Fig. 5. In applying such mechanism to the bridge circuit of Fig. 1A, conductors 2, 2a attached to the voice-coil, and magnet respectively or to the voice-coil and diaphragm are connected to the arm B—C of the bridge in the position designated by $C_0$.

Fig. 2 shows a modification of the circuit shown in Fig. 1A in which the bridge circuit has been modified so that an insert voltage can be applied to a microphone which has one side directly grounded. In such arrangement, the resistor R1 is mounted remotely from the microphone in the B—C arm of the bridge and the test terminals 2, 3 are connected across resistor R2 in the arm B—D. The insert signal is, in this manner, applied in series with the sound source in the transducer represented by $C_0$. In either of the arrangements shown in Fig. 1A or 2, the insert voltage effectively appears across the microphone, since the other elements of the bridge which are in series with the microphone are so chosen that their impedance at sonic frequencies is very low relative to that of the microphone. The blocking condenser C1 is necessary when a polarizing voltage is applied to a condenser-type microphone. The condenser C1 is chosen so that its impedance is low relative to that of the microphone at sonic frequencies. The reactance introduced by the condenser C1 has little influence on the sensitivity of the motion-detecting system since it is in series with the extremely small capacitance presented by the high-impedance microphone $C_0$.

The current limiting resistor R3 effectively shunts the microphone to ground through the polarizing source $E_p$ in both of the modifications shown in Figs. 1A and 2. Its impedance at radio frequencies is therefore high as compared to the microphone $C_0$. When employed in the modification of Fig. 2, the resistor R3 is chosen so that its impedance at sonic frequencies is high relative to the other elements of the bridge which are in series with the insert voltage.

Fig. 3 shows a variation of the embodiment of Fig. 2 in which the auxiliary signal is applied directly across the transducer $C_0$, one end which is grounded as shown. In this modification, the input terminals for the driving signal are at the primary of an input transformer T5, the secondary of which is connected to one end of the transducer $C_0$ through the decoupling impedance R6 and coupling capacitor C5. Bias is supplied from source $E_p$ through resistor R3 as in the modification of Fig. 2. The capacitor C1 must be much larger than the combined capacitance of $C_0$ and C2 while the capacitance of C5 must exceed significantly the combined values of $C_0$ and C2.

While a separate high-frequency auxiliary signal source has been shown and described in connection with Figs. 1A, 2, and 3, it is apparent that the high-frequency signal may readily be obtained from the driving signal source. For example, the high-frequency source in a conventional signal generator such as the fixed oscillator in a beat-frequency oscillator or the output of an intermediate frequency stage in a radio receptor offers a convenient high-frequency source in order to practice the described procedure. In connection with a beat-frequency oscillator, the output of the monitoring circuit that measures the motion of the sound source may be conveniently used as a source of feedback voltage in the output amplifier of the beat-frequency oscillator, so that the oscillator may be stabilized to drive the sound source at a steady output level or with an arbitrarily chosen amplitude.

The monitoring techniques above-described can also be accomplished without employing a bridge circuit in accord with the embodiment illustrated in Fig. 6. In this embodiment $C_0$ represents the capacitance established by the moving sound source element of a transducer and is applied to the grid of an otherwise conventional oscillator. In this manner, the sound source is integrated into the grid tank circuit as a tuning element. The plate of the tube V9 is coupled to the grid through inductance coupling as represented by coils 8a, 8b. Excursion of the sound source creates frequency variations in the oscillator and the motion can therefore be detected by heterodyning with a local oscillator-mixer arrangement or by the use of a suitable discriminator. When this arrangement is employed with the "insert" techniques described the electrical signal driving the sound source which is applied to terminals 8c, 8d is rejected from the high-frequency motion-detecting circuit by a suitable filter.

The application of the described monitoring circuit for use with a microphone in precision calibrations employing "insert" techniques can be accomplished in the following manner. The output of the motion-detecting circuit is measured at terminals 4—5 by a suitable indicator or recorder applied to output terminals 9—10 in Fig. 1B when the microphone is exposed to sound. The sound is then discontinued and a measured voltage signal of appropriate magnitude is applied to the test terminals 2, 3 (Figs. 1A, 1B, 2, or 3) thus driving the microphone diaphragm so that the output of the motion-detecting circuit matches the previously recorded output. The excursion of the microphone diaphragm is the same when subjected either to the referred-to sound pressure or to the equivalent electrical driving signal. By means of such arrangement, variations in sensitivity of the motion-detecting system are readily compensated.

In another application of the monitoring techniques of this invention, the output from an audio signal generator may be applied to the input terminals 2—3 and the actual displacement of the sound source may be measured by observing the audio output signal obtained from the terminals 9—10 of the detector circuit of Fig. 1B. The displacement of the sound source caused by the application of such input signal is, in other words, manifested as a variation in the capacity $C_0$ and is therefore represented in the audio output signal.

In calibrating and testing loud speakers, it is common to apply a constant amplitude signal over a wide frequency range. Due to various factors which enter into the speaker efficiency, the moving element comprising the sound source of the speaker will be displaced different amounts at different frequencies. In accordance with the principles of the present invention, the output signal obtained from the detector may be employed to monitor the motion of the sound source. Furthermore, the variation in excursion of the sound source may readily be compensated merely by feeding back such signal to the amplifier driving the transducer.

Fig. 7 is a schematic block diagram of a circuit arrangement for controlling a loudspeaker type transducer. As indicated in Fig. 7, the capacitance between the voice-coil 11 and field magnet 12 of the loudspeaker is integrated as an impedance element in the arm B—C of the bridge. An electrical audio-signal generator and an amplifier 13 are employed to drive the speaker and an automatic volume control circuit 14 is connected between the output of the detector circuit of Fig. 1B and the amplifier 13 to provide inverse feedback.

Figure 8 shows a modification in which the output of the motion-detector is used to provide a positive feedback signal. This is illustrated for a capacitance-type sound source, but an electromagnetic transducer can also be used in the circuit connections arranged in a manner similar to Figs. 7 and 5. The combination of the acoustic load and the transducer controls the frequency of oscillations generated.

The invention has been particularly described with respect to a capacitive type reactance-varying system which is particularly applicable to the moving sound source in a transducer. However, it is obvious from a consideration of Fig. 1A, that any of the elements in arm B—C of the bridge can be varied to produce the described reactance change effects. For example, a device which exhibits inductive variation effects can be connected in place of the inductance L shown in Fig. 1A to produce reactance changes in the system. Moreover, the described invention is not limited for use at sonic frequencies. The system of the invention is applicable so long as the signal derived from the physical motion of a transducer sound source can be adequately separated from the driving signal. Therefore, although the applications described above employ an auxiliary signal which is higher in frequency than the driving signal, the converse is also possible.

It will be apparent that the embodiments shown are only exemplary and that various modifications can be made within the scope of invention as defined in the appended claim.

What is claimed is:

In a measuring circuit, modulating means including a variable reactance comprising a movable voice coil and a field magnet of a sound source, the value of reactance of said variable reactance being dependent upon the position of said voice coil relative to said field magnet, a source of electrical signals comprising an amplifier connected to a signal generator having a selected frequency range, means for applying the output of said source of electrical signals across said voice coil so that the movable voice coil is responsive to the output of said source of electrical signals, a source of carrier signals having a frequency range outside said selected frequency range, means connecting the output of said source of carrier signals across said modulating means in such a manner that the output of said modulating means is dependent upon the displacement of said voice coil, a detector connected to the output of said modulating means, and means for applying the output of said detector to said amplifier as a control signal.

References Cited in the file of this patent

UNITED STATES PATENTS

| | | |
|---|---|---|
| 1,732,393 | Andrewes | Oct. 22, 1929 |
| 2,025,719 | Blau et al. | Dec. 31, 1935 |
| 2,310,048 | Albersheim | Feb. 2, 1943 |
| 2,394,613 | Houlgate et al. | Feb. 12, 1946 |
| 2,400,953 | Roys | May 28, 1946 |
| 2,488,927 | Owens | Nov. 22, 1949 |
| 2,493,819 | Harry | Jan. 10, 1950 |
| 2,857,461 | Brodie | Oct. 21, 1958 |

OTHER REFERENCES

Gierke and Wittern: Condenser Microphone Sensitivity Measurement, Proc. I.R.E., June 1951, pages 633–635.